United States Patent [19]

Astle et al.

[11] Patent Number: 5,429,021

[45] Date of Patent: Jul. 4, 1995

[54] ELLIPTICAL MANWAY CUTTER

[75] Inventors: Henry Astle, Rancho Cordova; Clement Tremblay, Citrus Heights, both of Calif.

[73] Assignee: Tri Tool Inc., Rancho Cordova, Calif.

[21] Appl. No.: 137,265

[22] Filed: Oct. 18, 1993

[51] Int. Cl.⁶ .......................... B23B 3/26; B23B 5/16; B23B 29/034
[52] U.S. Cl. ........................ 82/123; 82/1.3; 82/113
[58] Field of Search .................. 82/1.3, 113, 123, 131; 30/103, 105

[56] References Cited

U.S. PATENT DOCUMENTS

| | | |
|---|---|---|
| 1,836,853 | 12/1931 | Laffineur et al. . |
| 1,953,402 | 4/1934 | Graham . |
| 2,472,374 | 6/1949 | Giles . |
| 2,475,539 | 7/1949 | Beauchemin . |
| 2,557,043 | 6/1951 | Wright et al. . |
| 3,057,235 | 10/1962 | Mey . |
| 3,557,647 | 1/1971 | Foreman et al. . |
| 3,641,851 | 2/1972 | Gibbs et al. . |
| 3,756,100 | 9/1973 | Bachmann . |
| 3,772,944 | 11/1973 | Becker et al. . |
| 3,803,957 | 4/1974 | Johnston et al. . |
| 3,908,491 | 9/1975 | Gilmore ................ 82/113 |
| 3,942,248 | 3/1976 | Sherer et al. ............ 30/103 |
| 4,050,335 | 9/1977 | Gilmore ................ 82/113 |
| 4,186,630 | 2/1980 | Lindhag ................ 82/113 |
| 4,210,039 | 7/1980 | Willemin . |
| 4,250,778 | 2/1981 | Christoph ............... 82/123 |
| 4,250,779 | 2/1981 | Feller et al. . |
| 4,501,751 | 2/1985 | Estrada . |
| 4,577,532 | 3/1986 | Cavalli . |
| 4,677,884 | 7/1987 | Kwech et al. ........... 82/113 |
| 4,981,055 | 1/1991 | Vanderpol et al. ....... 82/113 |
| 5,012,710 | 5/1991 | D'Andrea et al. . |
| 5,022,294 | 6/1991 | Higuchi et al. . |
| 5,050,291 | 9/1991 | Gilmore ................ 82/123 |

*Primary Examiner*—William E. Terrell
*Attorney, Agent, or Firm*—Bacon & Thomas

[57] ABSTRACT

A machine tool for resurfacing seats surrounding non-circular openings in members, such as elliptical manways, includes a housing adapted to be mounted in the opening, and a tool bit carried by a slide mechanism mounted on the housing for rotation about a central axis. The slide member is resiliently biased outwardly to urge a tracker wheel into engagement with an inner surface of the opening, whereby the tool bit is constrained to follow the contour of the non-circular opening as it moves across the seat during a resurfacing operation. Movement of the tool bit across the surface being refaced is achieved by a feed screw driven from a feed sprocket that engages a tripper pin upon each revolution of the tool about the central axis.

5 Claims, 10 Drawing Sheets

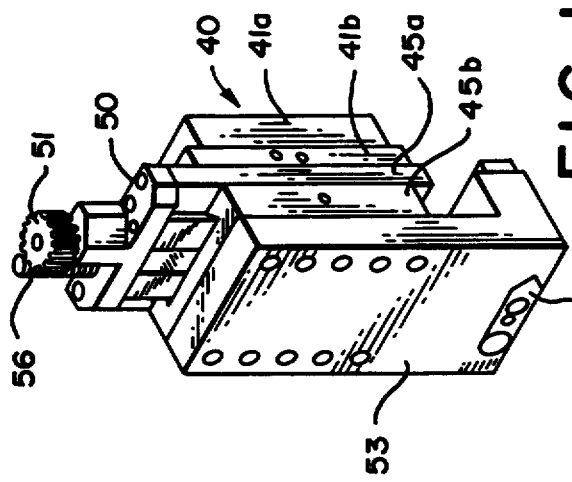
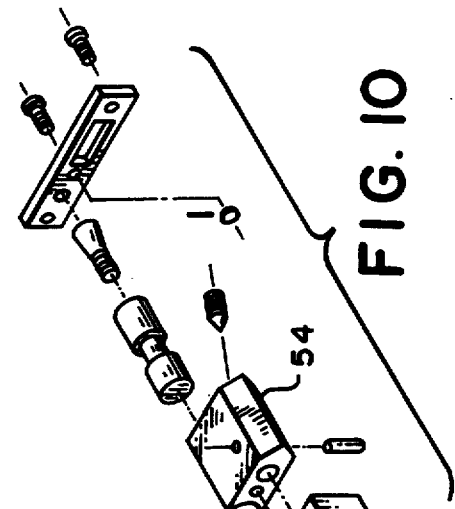
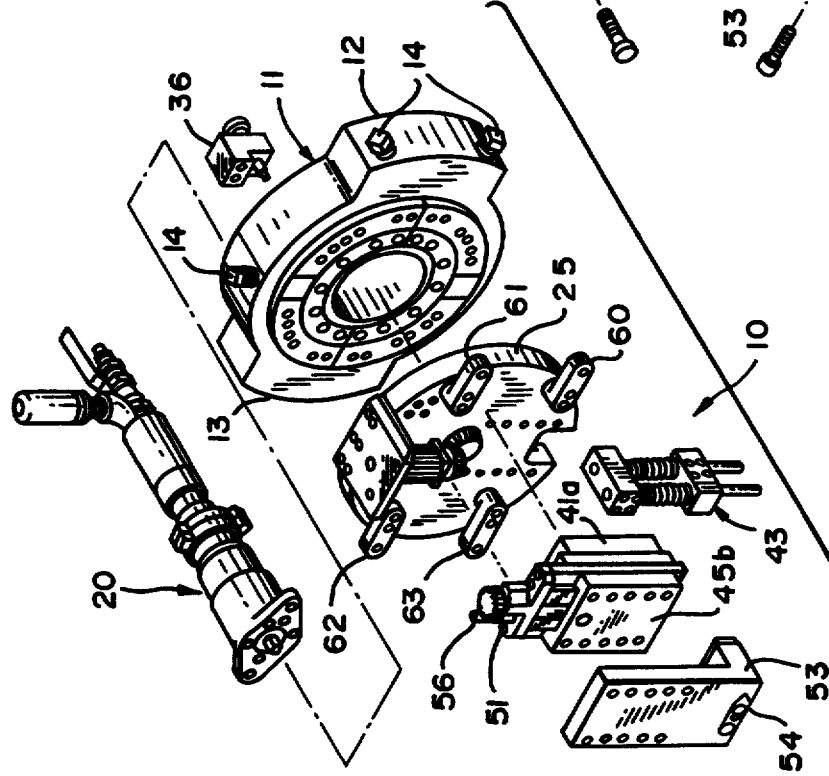
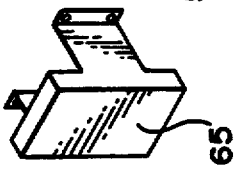

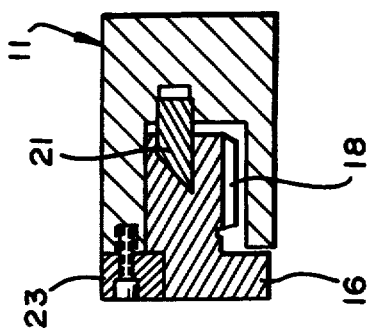
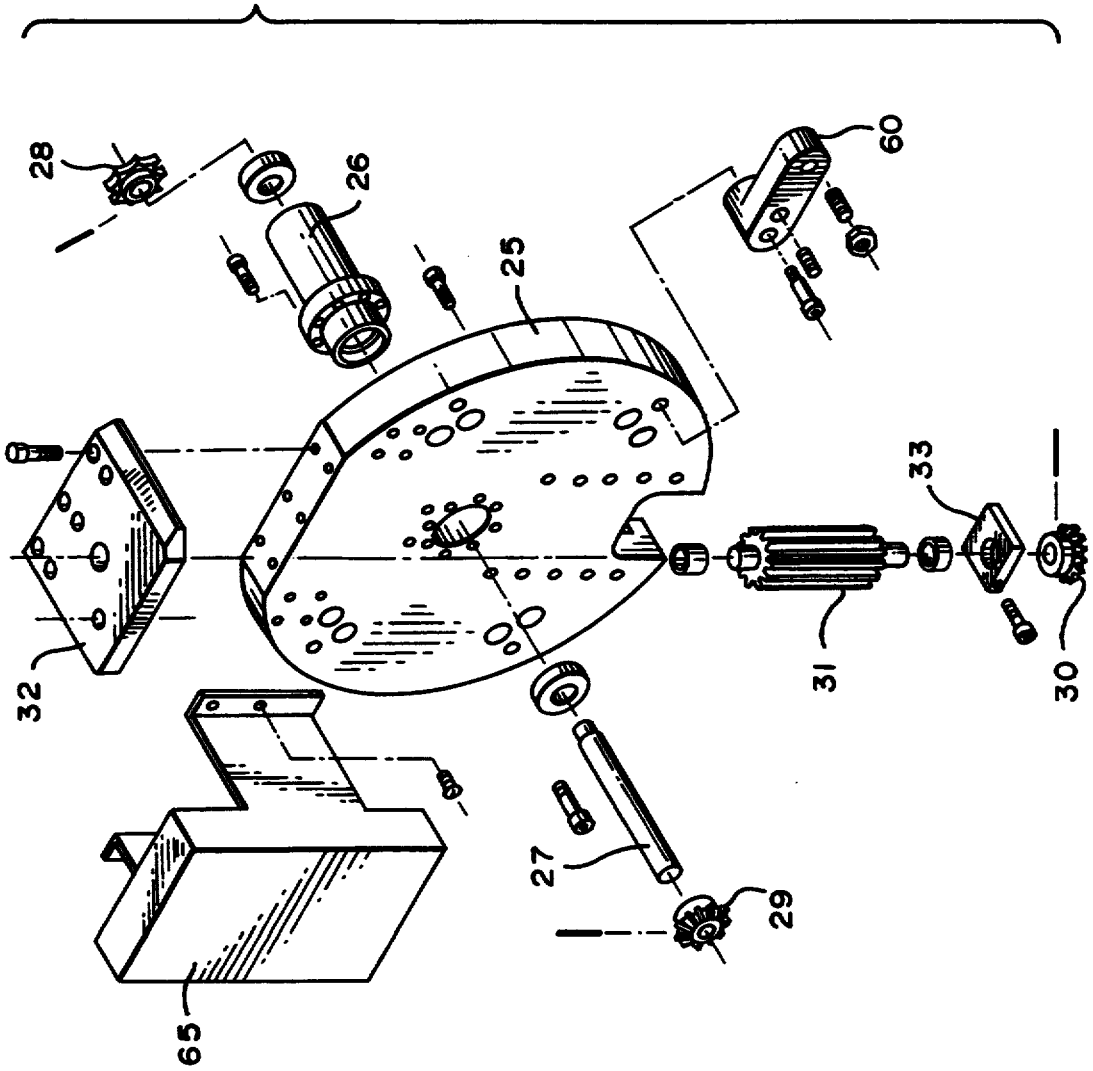

ELLIPTICAL MANWAY CUTTER

FIELD OF THE INVENTION

This invention relates to machine tools. More particularly, the invention relates to a portable lathe, especially one adapted to reface the sealing surface of an elliptical manway.

BACKGROUND OF THE INVENTION

Many vessels are provided with openings or manways for gaining access to the interiors of the vessels. An axially facing seat or sealing surface may surround the manway on the interior of the vessel for cooperation with a closure that is manipulated from outside the vessel to seat against the sealing surface.

In use, such sealing surfaces may become worn or pitted so that leakage results. When this happens, it is necessary to reface the sealing surface. However, the location of the sealing surface on the inside of the vessel makes this task difficult to perform. At one time, the entire device or section was replaced, at considerable expense and loss of time, or the sealing surface was repaired by welding or other measures. Neither of these measures was satisfactory.

The difficulty of refacing such surfaces is even greater when the opening is not round, as, for example, when the manway is elliptical in shape.

In an effort to solve the problems associated with repair of such surfaces or seats, various tools have been developed to resurface the seat in situ. These have included portable resurfacing tools such as described in U.S. Pat. No. 2,472,374, for example. The device described in this patent is inserted through the opening from outside the vessel and secured in place so that a cutting bit 30 is positioned to move across the face of the seat a' to resurface it as the tool is rotated in the opening. Movement of the bit across the seat is effected by cooperation between a follower pin 32 and elliptical cam groove 15. In addition, the bit may be moved radially inwardly and outwardly across the seat by fluid pressure in piston 50 acting in opposition to spring 52. The tool is located and held in the opening by plungers 80 and feet 91.

The tool described above is manually operated and is especially adapted for resurfacing the seat around small openings, such as hand holds and the like.

SUMMARY OF THE INVENTION

A general object of the present invention is to provide a portable machine tool for refacing the sealing surface or seat at the terminus opening of and defining on elliptical manway. More specifically, the machine tool of the present invention is a portable, power-driven lathe having means for positioning and securing it in an elliptical opening so that a tool bit carried by the machine can be moved accurately across the seat radially extending surrounding the opening to resurface the seat.

The tool of the invention is provided with easily operated and simple structure to enable the tool to be quickly and accurately positioned and secured in the elliptical opening. This structure includes a plurality of jackscrews which are extended radially outwardly to contact the inner peripheral surface of the manway to radially locate and secure the tool in place in the manway, and a plurality of pivotable locating fingers which are moved radially outwardly to engage the surface surrounding the opening to axially locate the tool in the opening.

The tool bit is carried on a tool carrier which is supported for movement in both radial and circumferential or rotational directions relative to the axis of the opening, whereby as the tool is operated, the tool bit moves circumferentially along the surface to be refaced, as well as radially across it.

To achieve this compound rotational movement along an elliptical path, the tool carrier is mounted on a slide that is, in turn, connected to a face plate and head stock for rotation about the axis of the manway opening. The slide is biased radially outwardly to press a tracking wheel against the inner surface of the manway, whereby the slide and tool bit accurately follow the curvature of the manway opening as they are rotated around the axis of the opening. Movement of the bit across the surface being refaced is accomplished by a tripper pin in the path of a feed sprocket that rotates with the face plate so that the feed sprocket is indexed through an increment of rotation once every revolution of the face plate and slide. The feed sprocket is connected through a gear train to move the tool carrier transversely with respect to the surface being refaced every time the feed sprocket engages the tripper pin. Different rates of advancement of the tool bit across the face of the surface being reconditioned can be accomplished by using more than one tripper pin to engage the feed sprocket during each revolution of the face plate.

The machine tool of the invention comprises a housing that is fixed in the manway opening during use by means of radially directed jackscrews, with the face plate and its associated parts being rotationally carried on the housing. Segmented bearing means such as used in applicant's TriTool Model No. 504SB, for example, may be interposed between the housing and headstock in the present invention.

The headstock, and thus the face plate and associated parts, including the tool carrier and tool bit, are driven by a pneumatic motor that has a pinion gear meshed with a ring gear on the headstock.

The invention thus provides a simple and effective power driven portable lathe for accurately and easily reconditioning an elliptically shaped surface around a manway opening inside a vessel. Because of its unique construction, including the tracker wheel and tool carrier slide, which follow the contour of the surface being refaced, the tool is easy to use and gives accurate results over a range of diameters and variations in curvature.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein:

FIG. 9 is an exploded perspective view of the machine tool of the invention;

FIG. 10 is an exploded perspective view of the tool carrier and tool holder of the invention;

FIG. 11 is a perspective view of the tool carrier and slide mechanism of the invention, shown in assembled relationship;

FIG. 13 is an exploded perspective view of the face plate, thrust plate, shroud, and miter gears, feed gear, shroud and locating arms;

FIG. 14 is a fragmentary sectional view of a portion of the housing, headstock, and bearings;

DETAILED DESCRIPTION OF THE PREFERRED EMBODIMENT

Referring more specifically to the drawings, the machine tool of the invention is represented generally at 10 in FIGS. 1-4 and 6-11. The machine tool comprises a housing 11 having radially enlarged lobes 12 and 13, with jackscrews 14 projecting generally radially from the outer margin of the lobes and from diametrically opposite portions of the main housing. The elongated shape of the housing adapts it to closely follow the inner peripheral contour of the elongated elliptical shape of a manway opening 15, whereby the jackscrews 14 need be adjusted through only a small distance to contact the inner peripheral surface of the opening.

Figure 17:
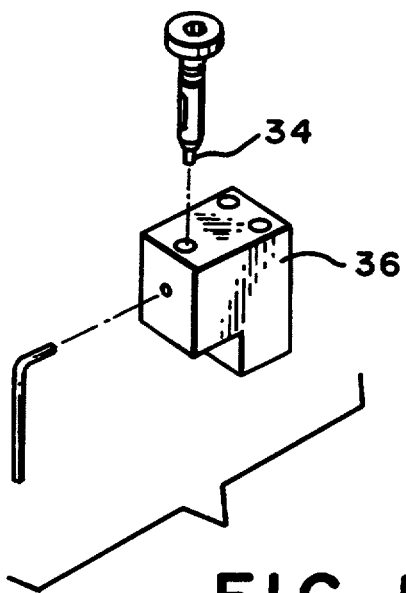
FIG. 17 is a partially exploded top perspective view of the tripper bracket and pin.
Figure 18:
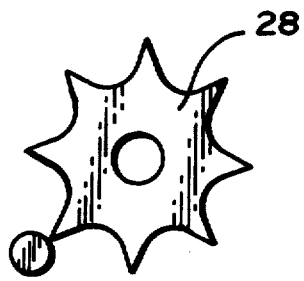
FIG. 18 is a somewhat schematic end view of the feed sprocket and tripper pin, showing their relationship to one another as the feed sprocket orbits about the axis of the machine tool.
Figure 16:
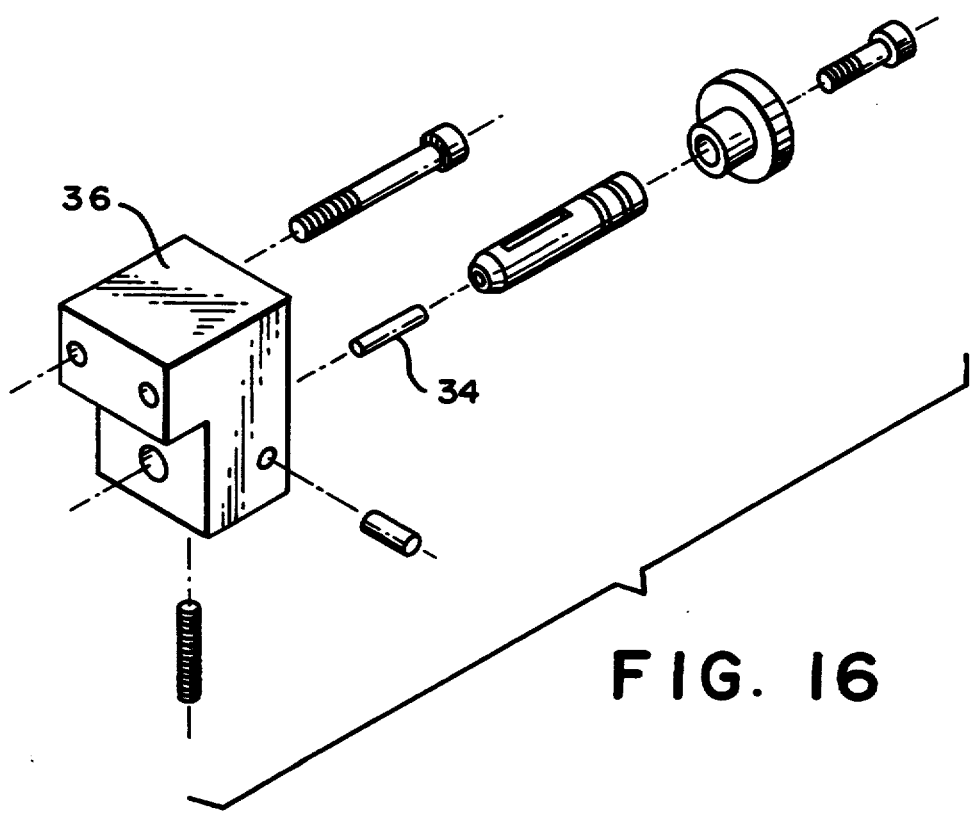
FIG. 16 is a bottom exploded perspective view of the tripper bracket assembly.

A segmented headstock 16 is rotatable in a recess 17 in a forward portion of the housing, and has a ring gear 18 on an outer surface thereof for meshing engagement with drive pinion gear 19 that is driven by motor 20 supported on the rear of the housing. A segmented main bearing 21 and felt seal 22 are interposed between the headstock and main housing, and a thrust plate 23 and felt seal 24 are engaged against the front side of the headstock (see FIG. 17). When the housing is secured in an elliptical manway opening, the central axis of rotation of the headstock coincides with the central axis of the manway opening. Moreover, when the housing is secured in the elliptical manway opening, it is positioned to be operated from outside the vessel for which the manway opening is provided. The housing and the entire machine tool are dimensioned so as to be positionable within a manway opening from the exterior of the vessel in which the opening is provided.

Figure 15:
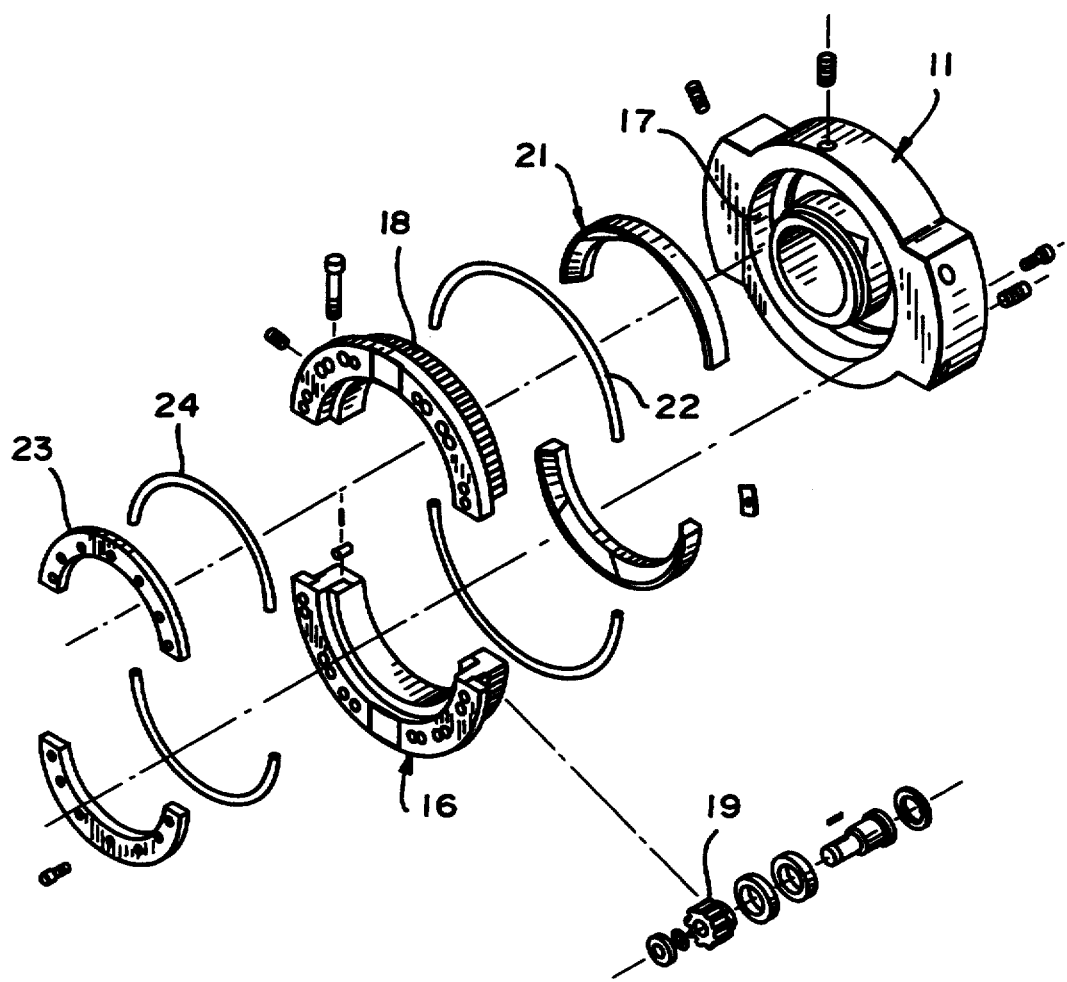
FIG. 15 is an exploded perspective view of the main housing, headstock, bearings, and drive pinion gear.

A disc-like face plate 25 is secured on the front of the headstock for rotation therewith, and carries an axially oriented support housing 26 in radially offset relationship to the axis of rotation of the plate, whereby the support housing has an orbital motion around the central axis of the main housing 11. A transfer shaft 27 extends through the support housing 26 and has a feed sprocket 28 on one end and a bevel or miter gear 29 on its other end (see FIG. 15). Miter gear 28 meshes with another miter gear 30 fixed on one end of an elongate, radially oriented spline feed gear 31 supported for rotation about its elongate on the front of the face plate radially outwardly of the support housing 26 by thrust plate 32 and bearing support 33.

A pair of diametrically opposite, axially oriented tripper pins 34 and 35 are supported on the rear surface of the main housing in tripper brackets 36 and 37, in positions to be engaged by the feed sprocket 28 as the feed sprocket orbits around the axis of the housing. Either or both of the tripper pins may be moved into and out of positions to engage the feed sprocket during rotation of the face plate. Each time the feed sprocket engages a tripper pin it is caused to index through an increment of rotation, thereby rotating the miter gears and feed gear through a corresponding increment of rotation.

Tool carrier and slide assembly 40 are mounted on the front of the face plate for rotation therewith. The slide assembly includes a first fixed slide member or dovetail rail 41a that is fixed to the front of the face plate 25 diametrically opposite the eccentrically positioned support housing 26, and a second movable slide member or dovetail rail gib 41b that is slidably engaged with rail 41 a via a dovetail connection for movement rectilinearly in a radial direction perpendicular to the central rotational axis of the tool with respect to the face plate.

A pair of compression spring assemblies 42 and 43 are engaged between the movable dovetail rail 41b and the face plate 25 to yieldably urge the moveable dovetail rail in a radially outward direction.

A tracker wheel or follower 44 is fixed on the movable dovetail rail 41b, and when the machine is in operative position in a manway opening, the tracker wheel 44 is urged by the spring assemblies 42 and 43 into fRictional contact with the inner diameter or peripheral surface of the manway opening, whereby as the face plate rotates about the axis of the housing, the tracker wheel follows the contour of the peripheral surface of the manway opening and causes the moveable dovetail rail 41b to likewise follow the contour of the opening.

A third dovetail rail 45a is mounted on the front of moveable rail 41b for movement therewith, (i.e., rails 41b and 45a move as a single slid assembly) and carries a fourth dovetail rail a slide 45b which is movable rectilinearly with respect to rail 45a in a plane perpendicular to the central rotational axis of the tool. A feed nut 46 is engaged in an opening 47 in rail 45b, and extends into clearance slot 48 in rail 45a. Feed screw 49 is threadably engaged at one end with nut 46 and extends at its other end through a feed pinion block 50 secured on the upper end of rail 45a. A pinion gear 51 on the upper end of the feed screw is engaged with the feed gear 31, whereby as the feed gear is rotated each time a feed sprocket engages a tripper pin, the pinion gear and feed screw are also rotated to move the rail 45b radially outwardly with respect to the rail 45a.

A generally L-shaped tool carrier 53 is secured on the front of the rail 45b for movement therewith, and has a tool holder 54 on its lower end which carries a tool bit 55 extending towards and in position for movement across the seal surface to be refaced. The tool carrier and rail 45a may be retracted by turning a retracting screw 56 extended through the thrust plate 32 and pinion block 50 into the rail 45a.

Figure 1:
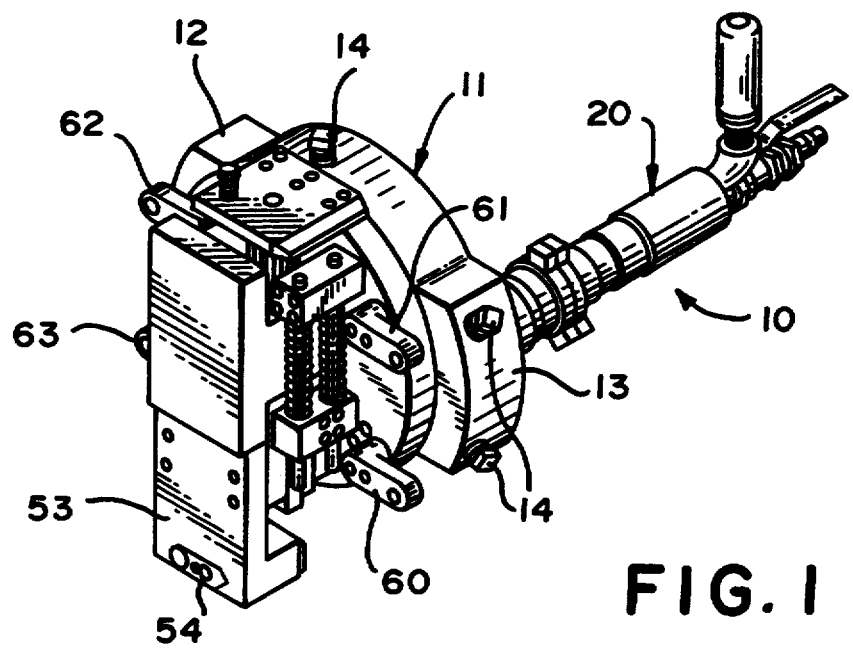
FIG. 1 is a top perspective view of the machine tool of the invention, shown from the end carrying the tool bit and that would normally be disposed interiorly of the vessel whose manway is being resurfaced.
Figure 2:
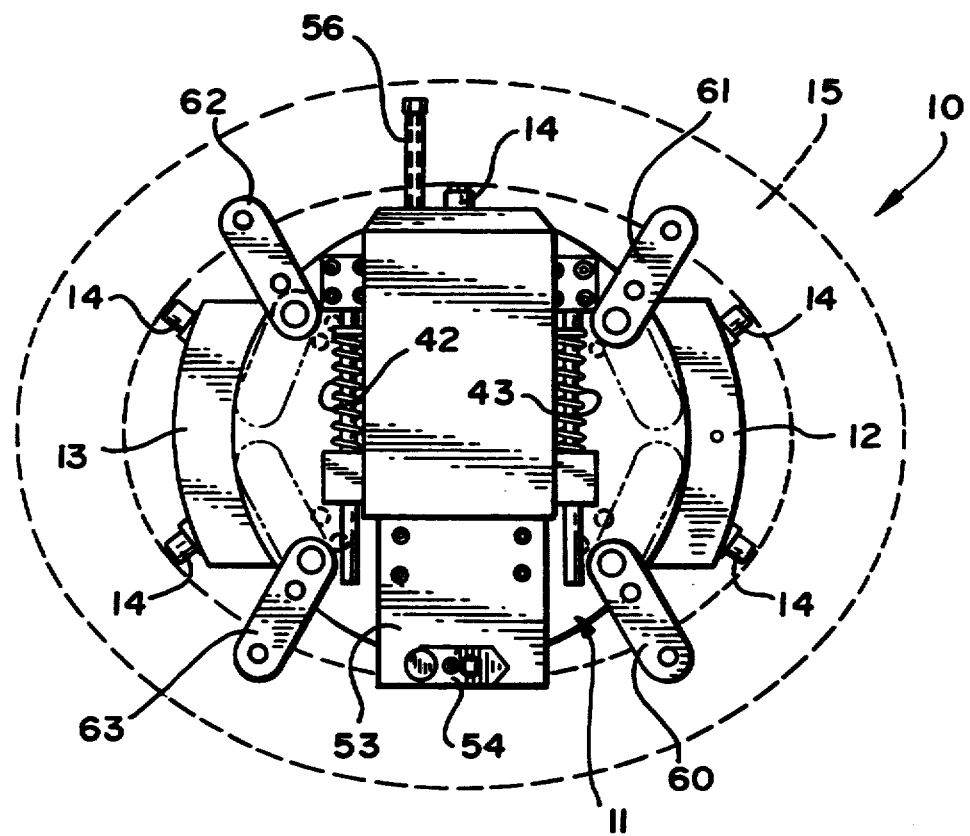
FIG. 2 is an end view of the machine of FIG. 1, as it would appear if viewed from inside the vessel whose manway is being resurfaced.
Figure 3:
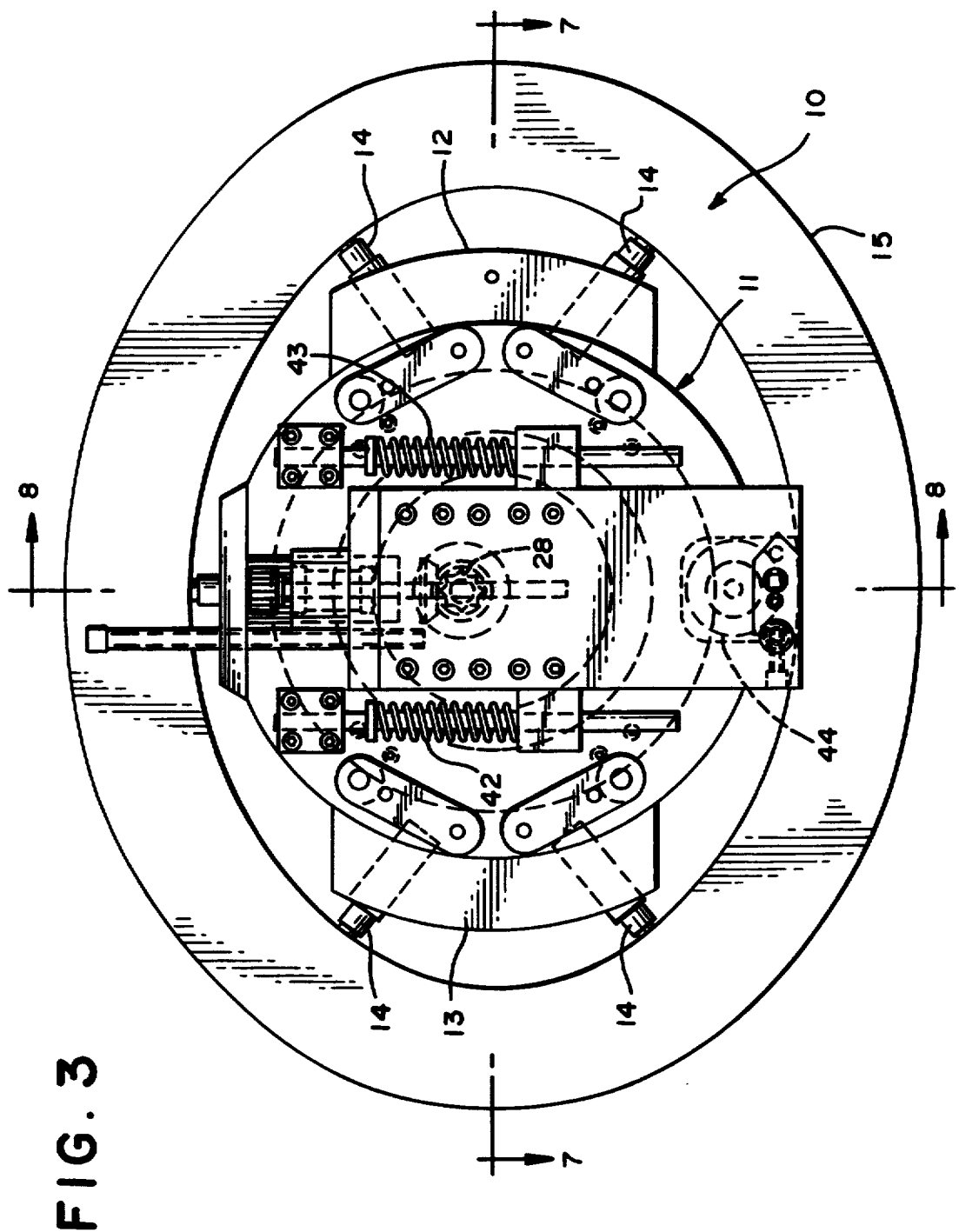
FIG. 3 is an enlarged view similar to FIG. 2, with hidden parts shown in dashed lines.
Figure 4:
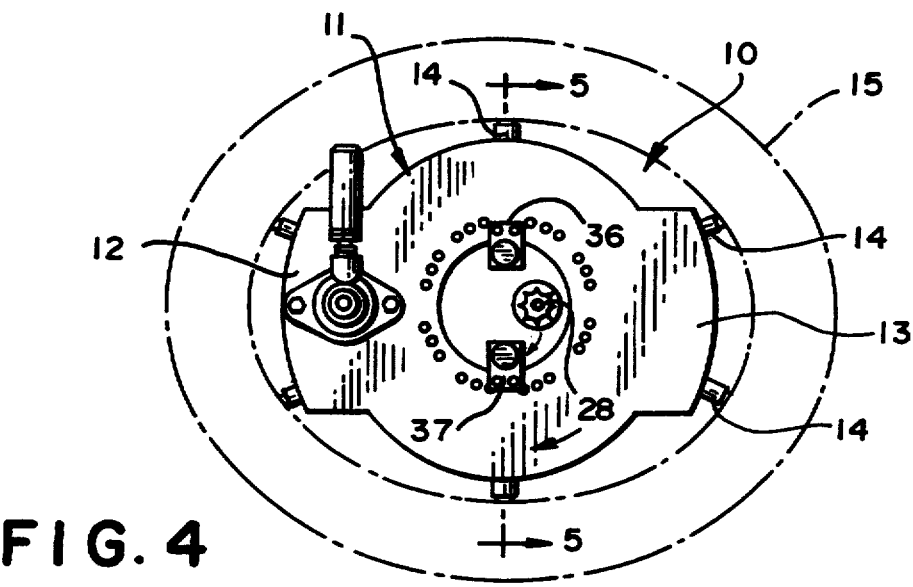
FIG. 4 is a rear view of the machine of FIG. 1, viewed from outside the vessel and showing the tripper pins and feed wheel for advancing the tool bit across the work face.
Figure 5:
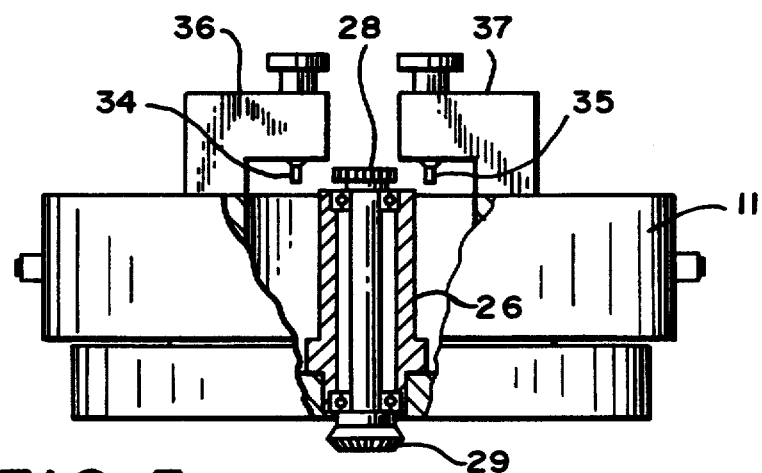
FIG. 5 is a transverse sectional view taken along line 5—5 in FIG. 4.
Figure 6:
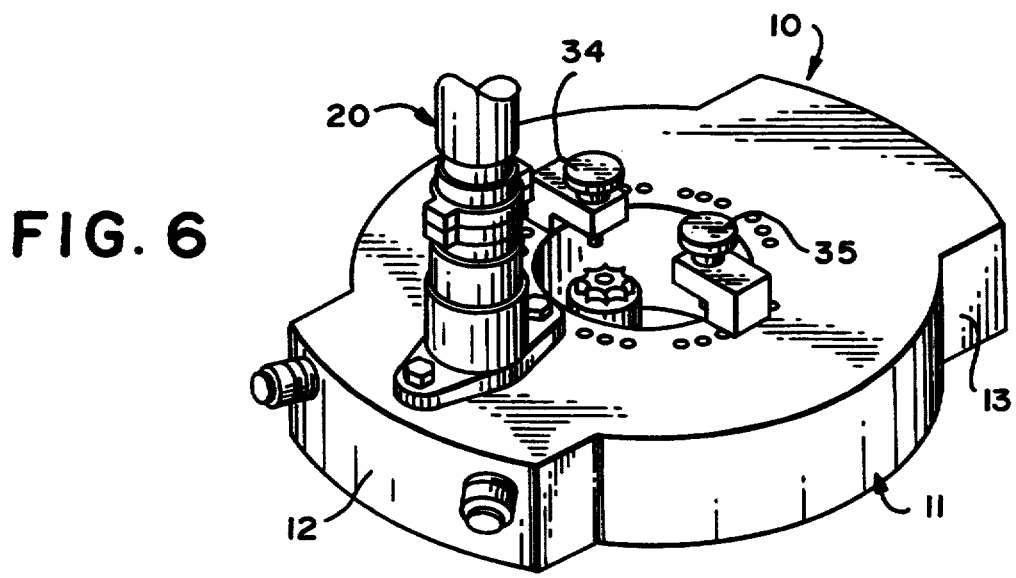
FIG. 6 is a rear perspective view of the machine tool of FIG. 1, showing the tripper mechanism and the pneumatic motor.
Figure 7:
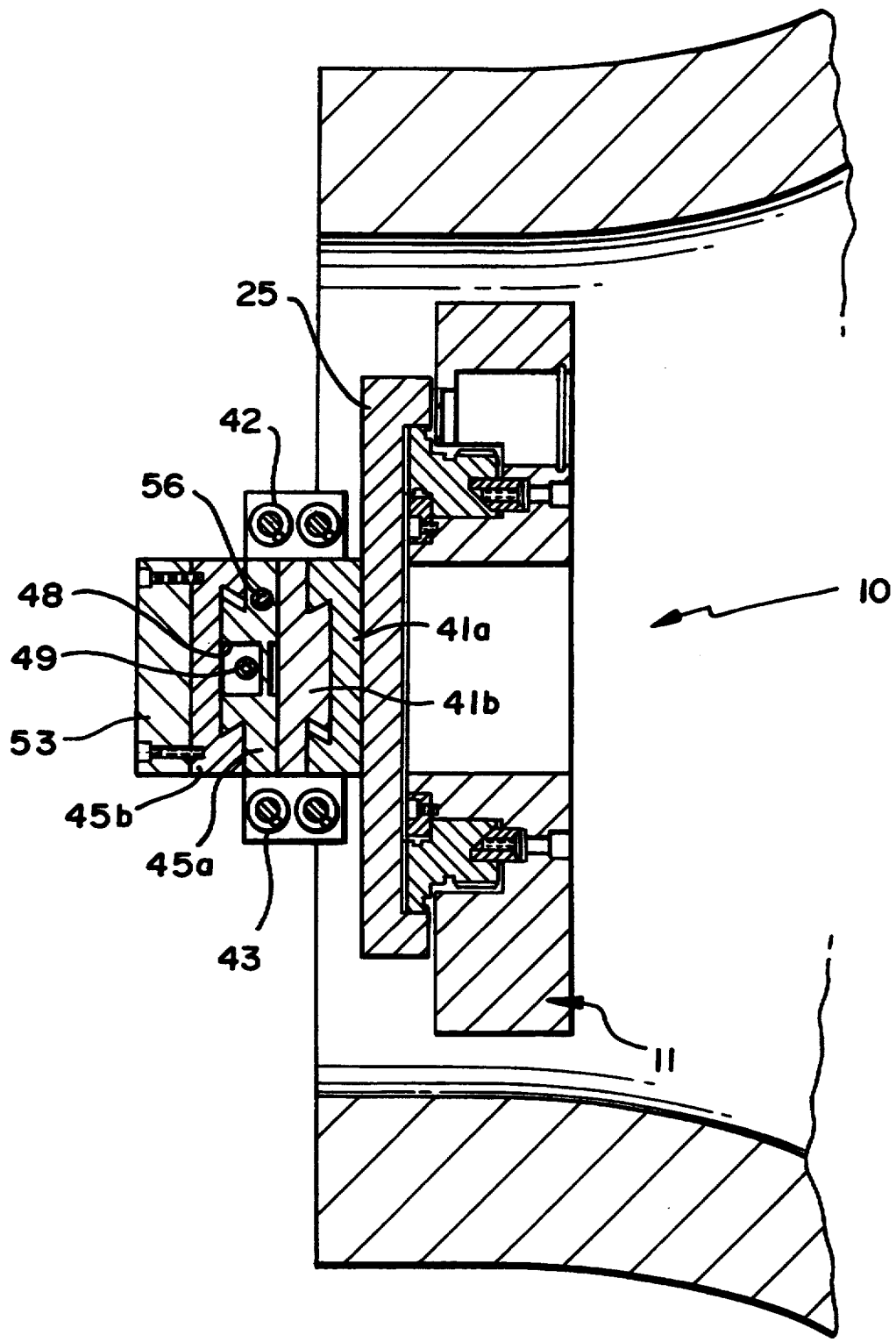
FIG. 7 is an enlarged view in section taken along line 7—7 in FIG. 3, with portions removed for purposes of clarity, and showing the relationship of the tool carrier, slide, face plate, housing and bearing means.
Figure 8:
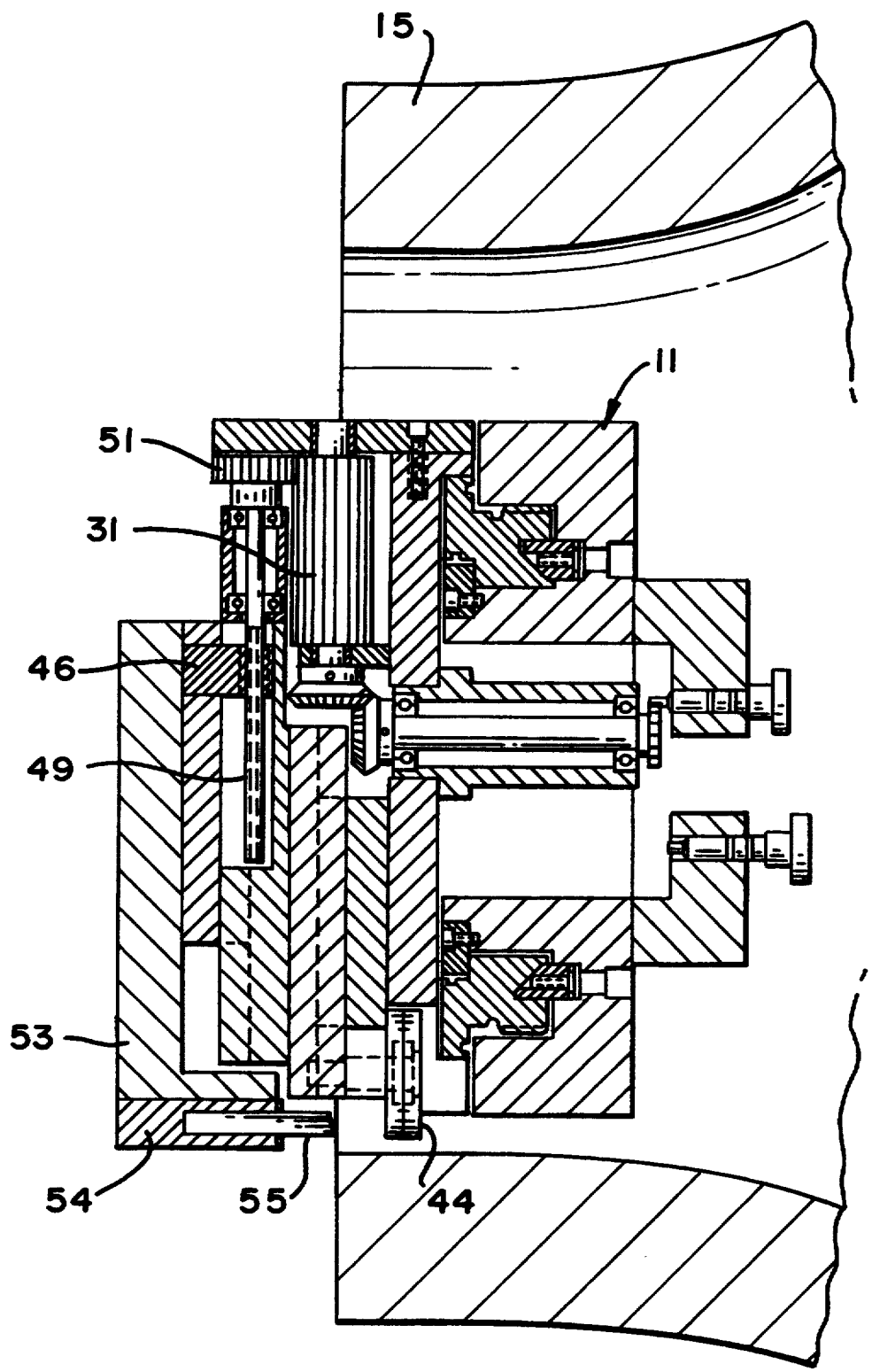
FIG. 8 is an enlarged view in section taken along line 8—8 in FIG. 3, showing the relationship of the tool carrier, slide, tracker wheel, gear drive means, tripper pins and bearing means.
Figure 12:
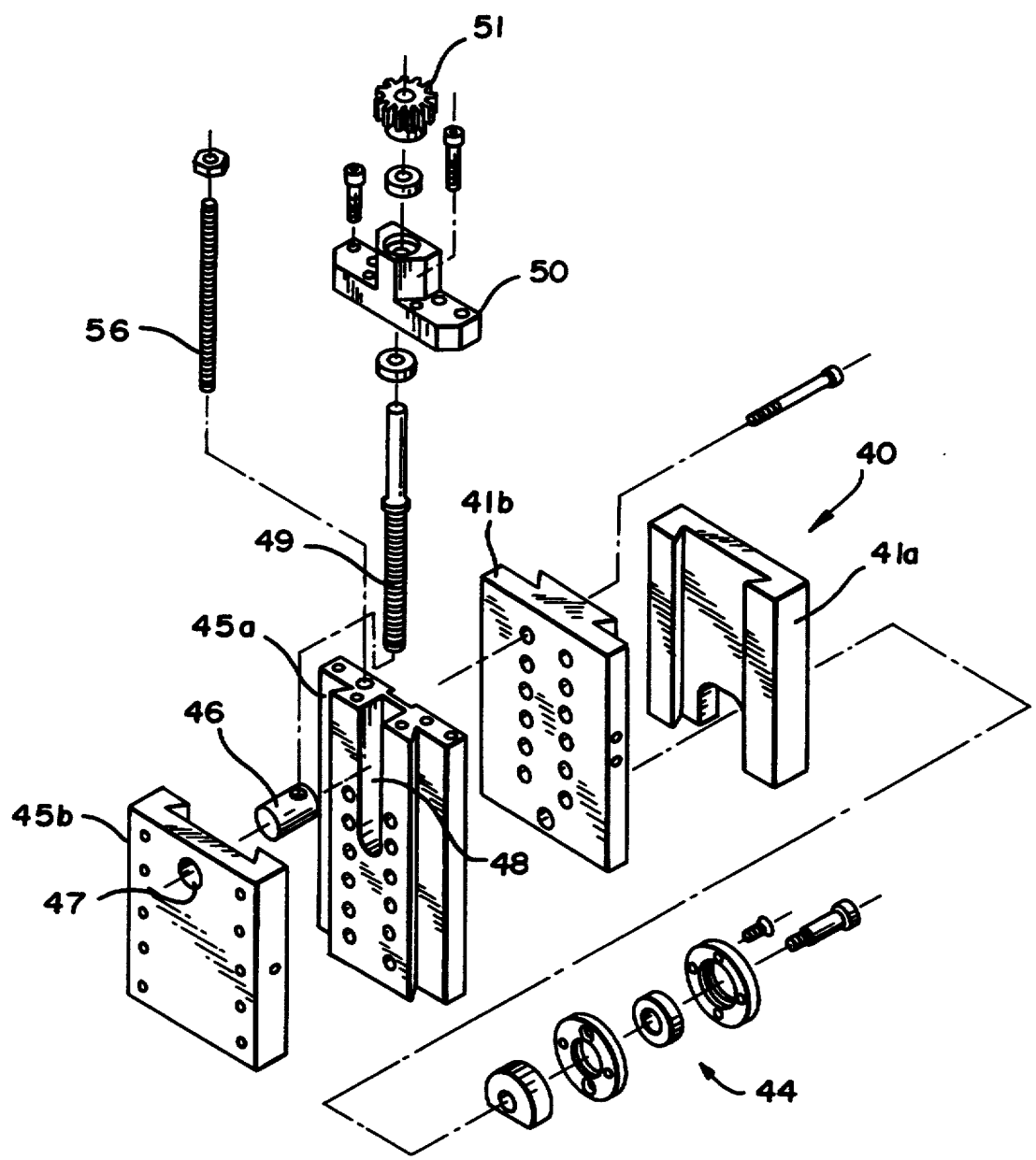
FIG. 12 is an exploded perspective view of the slide mechanism and tracker wheel subassembly.

A plurality of locating arms 60, 61, 62 and 63 are pivotally mounted at one of their ends on the face plate, and when in an outwardly pivoted position as shown in full lines in FIG. 2, extend at their other ends radially outwardly over the end of the manway opening. After the machine has been properly located in the manway opening, the arms are pivoted inwardly to their stored position, as shown in dot-and-dash lines in FIG. 2.

A shroud 65 may be secured to the front of the face plate to cover the feed gear and related components for aesthetic and safety reasons.

In use, the locating arms are pivoted inwardly to their stored position and the jackscrews are adjusted to just slightly clear the inside diameter of the manway opening. The machine is slid into the opening from outside the vessel, with the jackscrews contacting the inner surface of the opening and approximately radially centering the machine in the opening. From a position outside the vessel, the locating arms are then pivoted outwardly over the face of the opening and the machine is pulled back to engage the arms against the face, thereby axially aligning the machine in the opening. The jackscrews are then adjusted to tighten against the inner surface of the manway, securing the machine in place.

Proper alignment of the tripping pins and feed sprocket is checked, and one or both of the tripping pins is then pushed forward into the path of the feed sprocket. The tool bit is adjusted so that it rests just at the inner margin of the surface to be refaced, with the depth of cut being selected according to requirements and/or specifications. The pneumatic motor is then actuated to begin rotating the head stock, face plate and tool carrier at a desired number of revolutions per minute. Depending upon the desired rate of feed of the tool bit across the surface to be refaced, one or both of the tripper pins is moved into position to be engaged by the feed sprocket, which causes the tool bit to advance an increment across the face each time the sprocket engages a tripper pin.

Rotation of the face plate causes the tracker wheel 44 to follow the periphery of the manway opening in a radial sense causing the slide assembly 41b, 45a and tool carrier 53 to move radially in a likewise manner. The spline feed gear 31 incrementally and selectively advances the tool carrier radially relative to the slide assembly 41b, 45a while the carrier is moving with the latter to follow the contour of the opening periphery. Thus, the tool bit carried by the tool carrier will traverse the radial seal surface of the manway opening in cutting relationship to provide a new seal surface that is planar and extending perpendicular to the central rotational axis of the tool.

While the invention has been described in detail, it is to be understood that various changes and modifications may be made therein without departing from the spirit and scope of the invention, as defined in the appended claims.

What is claimed is:

1. A machine tool for refinishing a radially extending seal surface at the terminus of a longitudinally extending non-circular opening defined by at least a non-circular inner peripheral wall surface in a structural member, comprising:

a housing dimensioned to fit within an opening corresponding to the above-recited opening;

means carried by the housing for engaging and securing the housing against movement relative to the inner peripheral wall surface of a noncircular opening;

a face plate supported on the housing for rotation about a central rotational axis extending perpendicular to the plane including a radially extending seal surface to be refinished;

a first slide device fixed to the face plate for rotation therewith and including a dovetail gib surface extending along the first slide device perpendicular to the central axis;

a second slide device including a first dovetail gib surface on one side thereof in sliding engagement with the dovetail gib surface of the first slide device and a second dovetail gib surface on the opposite side thereof, said second slide device moveable rectilinearly relative to said first slide device perpendicular to said central axis along a pair of engaged dovetail gib surfaces;

a tool carrier including a dovetail gib surface in sliding engagement with the second dovetail gib surface of the second slide device, said tool carrier moveable rectilinearly relative to the second slide device in a direction perpendicular to said central axis and arranged to rotate with the second slide device, said tool carrier including a tool bit holder arranged to support a tool bit so that the bit extends generally parallel to the central axis and towards a radially extending seal surface to be refinished;

a tracker device connected to the second slide device and adapted to radially and frictionally engage the non-circular inner peripheral surface of a non-circular opening adjacent the radial seal surface, said tracker device and second slide device connected to move as a single structural unit in rectilinear directions perpendicular to the central rotational axis of the face plate when the second slide device is rotated about the central rotational axis and the tracker device moves radially in following the contour of a non-circular peripheral inner surface;

spring biasing means for resiliently biasing the second slide device radially outwardly from the central axis to cause said tracker device to frictionally engage an opening inner peripheral surface;

a tool feed system for incrementally advancing the tool carrier transversely of the central rotational axis while the tool carrier is rotating about the central axis and moving rectilinearly relative to the second slide device to cause the tool bit to traverse the seal surface to be refinished, said feed system including:

a radially extending spline feed gear having elongated gear teeth and mounted on the face plate for rotation therewith about the central rotational axis, said spline feed gear being rotatable about a radially extending spline gear rotational axis;

a pinion feed gear in driving engagement with the spline feed gear, said pinion feed gear mounted on the second slide device for rotation therewith about the central axis and for rectilinear reciprocation therewith relative to the first slide device, said pinion feed gear sliding relative to and along the spline feed gear when the second slide device slides radially relative to the first slide device;

a threaded feed screw connected to the feed pinion gear for rotation therewith and a threaded feed nut secured to the tool carrier, said feed screw and feed nut being threadedly connected so that rotation of the feed screw drives the feed nut and tool carrier in radial sliding relationship relative to the second slide device; and means for selectively and incrementally rotating the spline feed gear in response to rotation of the face plate whereby the feed screw is selectively and incrementally rotated to advance the tool carrier in a direction parallel to the seal surface to be refinished upon rotation of the face plate about the central axis.

2. A machine tool as claimed in claim 1, wherein said feed assembly further includes a rotatable transfer shaft extending parallel to and offset from said central axis, and carried by the face plate for orbiting motion about the central axis, said shaft having opposed ends; a first bevel gear at one end of said shaft; a second bevel gear connected to one end of the spline feed gear; said first and second bevel gears meshed in driving relationship; a tripper sprocket secured to the other end of the shaft; at least one fixed tripper pin secured to the tool housing for engaging the tripper sprocket periodically as the shaft orbits with the rotating face plate; and means for selectively removing the tripper pin from the path of motion of the tripper sprocket.

3. A machine tool as claimed in claim 1, including means for manually actuating the second slide device and tool carrier to slide radially relative to the first slide device against the bias of said spring biasing means and independently from the tracker device motion.

4. A machine tool as claimed in claim 1, including at least three circumferentially spaced locating arms carried by the face plate, radially spaced from the central axis and pivotable between a radially extended position opposite a sealing surface to be resurfaced and a radially retracted position within the outer periphery of the face plate, whereby the tool can be positioned in an aperture relative to a radially extending seal surface thereof at a predetermined location with the locating arms radially extended.

5. A machine tool as claimed in claim 1, wherein said spring means comprises at least a pair of coil compression springs extending perpendicular to the central axis on opposite sides thereof adjacent said second slide device, said springs extending between an abutment fixed relative to said face plate and an abutment carried by said second slide device.

* * * * *